(12) United States Patent
Kato

(10) Patent No.: US 6,722,289 B2
(45) Date of Patent: Apr. 20, 2004

(54) TABLE SYSTEM WITH ANGULAR POSITION CONTROLS

(75) Inventor: Masataka Kato, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 28 days.

(21) Appl. No.: 10/141,958

(22) Filed: May 10, 2002

(65) Prior Publication Data

US 2002/0170188 A1 Nov. 21, 2002

(30) Foreign Application Priority Data

May 16, 2001 (JP) .................................. 2001-145919

(51) Int. Cl.$^7$ ............................................ A47B 85/00
(52) U.S. Cl. .................................. 108/20; 108/22; 74/16
(58) Field of Search .............................. 74/16, 813 R, 74/825, 826, 813 C; 108/22, 20, 21

(56) References Cited

U.S. PATENT DOCUMENTS

| 3,155,383 A | * | 11/1964 | Whitmore | 108/20 |
|---|---|---|---|---|
| 4,656,951 A | * | 4/1987 | Kimura et al. | 108/20 |
| 5,031,547 A | * | 7/1991 | Hirose | 108/20 |
| 5,059,755 A | * | 10/1991 | Nottingham et al. | 108/20 |
| 5,117,761 A | * | 6/1992 | Kasai et al. | 108/22 |
| 5,163,651 A | * | 11/1992 | Matsumoto | 108/20 |
| 5,201,249 A | * | 4/1993 | Sterenberg | 74/825 |
| 5,501,119 A | * | 3/1996 | Yanagisawa | 108/20 |
| 6,334,398 B1 | * | 1/2002 | Eason et al. | 108/20 |
| 6,550,401 B2 | * | 4/2003 | Chiba | 108/20 |

FOREIGN PATENT DOCUMENTS

JP          3-121340         *  5/1991

* cited by examiner

*Primary Examiner*—Jose V. Chen
(74) *Attorney, Agent, or Firm*—Browdy and Neimark

(57) ABSTRACT

A table system with angular position control in which a table is moved accurately over a tiny angle in circular direction to any desired position. The table is supported on a bed for rotation through a crossed-roller bearing. Position control apparatus turns the table over a tiny angle through an arm plate fastened to the table. A nut and screw set cause a linear motion that is in line with a tangent of the table, and the linear motion is translated into a circular motion to turn the table by a first linear motion guide unit to control the linear motion in the tangential direction, and a second linear motion guide unit to control a linear motion in the direction facing the center of the table.

11 Claims, 4 Drawing Sheets

TABLE SYSTEM WITH ANGULAR POSITION CONTROLS

BACKGROUND OF THE INVENTION

1. Field of the Invention

The present invention relates to a table system with angular position controls, which can be used in fields as diverse as semiconductor manufacturing equipments, precision machines, machine tools, and so on to provide accurate position control of tiny angles in circular direction for an object such as a work mounted on a table.

2. Description of the Prior Art

Linear motion guide units constructed as shown in FIG. 7 are commonly known to those skilled in the art. The prior linear motion guide unit 40 is mainly comprised of an elongated track rail 41 and a slider 42 fitting astride over the track rail 41 for linear movement. The track rail 41 is made on widthwise opposing sides thereof with lengthwise raceway grooves 49, one to each side. The slider 42 is allowed to move along the track rail 41 in sliding way through rolling elements running in the grooves 49. The track rail 41 is made on a lengthwise upper surface thereof with bolt holes that are arranged lengthwise at a fixed interval. The track rail 41 is fastened down to any mounting base such as a bed, machine bed, working bench, and so on with fastening bolts that extend through the bolt holes in the track rail 41 to be screwed into the threaded holes in the mounting base. The slider 42 includes a casing 43, and end caps 44 secured to forward and aft ends of the casing 43, one to each end. The casing 43 is provided on an upper surface thereof with bolt holes that are used to fasten any other appliance, machine component, chuck, clamping jaw, and so on to the slider 42.

All the casing 43 and the end caps 44 are made with recesses that are formed forward and aft to fit over and conform to the track rail 41 to be allowed to move astride the track rail 41. Inside the recesses there are formed raceway grooves 50 that extend forward and aft in opposition to the raceway grooves 49 on the track rail 41 to cooperate with their confronting raceway grooves 49, defining load raceways between the confronting raceway grooves 49, 50 where rolling elements 46 such as balls or the like run through there. Moreover, a retainer band 47 is attached to the casing 43 to embrace the rolling elements 46 lest they fall away from the casing 43. The end caps 44 each has a turnaround where the rolling elements 46 are allowed to turn round for recirculation, and a claw to scoop the rolling elements 46 out of the raceway grooves 49 on the track rail 41 at any one of the forward and aft ends of the slider 42.

Also mounted on the end caps 44 are end seals 45, one to each end cap, for keeping sealing function between the track rail 41 and the lengthwise opposing ends of slider 42. The end caps 44 are fastened to the forward and aft end faces of the casing 43, one to each end face, with more than one fastening bolt that are tightened through bolt holes in the end caps 44. With the prior linear motion guide unit stated earlier, a ball-recirculating circuit for the rolling elements 46 is made up of the load raceway defined between the confronting raceway grooves 49 and 50, the turnarounds formed in the end caps 44, and a return passage 51 formed in the casing 43 to extend in parallel with the raceway groove 50. The slider 42 is allowed to move smoothly in and out relatively to the track rail 41 as more than one rolling element 46 runs through the load raceway with keeping rolling contact with the raceway grooves 49, 50, even under a considerably loaded condition. The linear motion guide unit of the sort stated above is applied with lubricant; usually grease to lubricate the rolling elements 46 in the recirculating circuit. To this end, there is provided a grease nipple 48 to supply lubricant to the recirculating circuit in which the rolling elements 46 run through there.

Moreover referring to FIG. 8, there is shown a prior rotary table system in which a servo-actuator is connected directly to a motor 60 in direct-drive manner to provide very fast, highly accurate position control in circular direction with no backlash or no lost motion. The servo-actuator to turn a table 52 in any circular direction to a desired angular position is mainly comprised of the motor 60, an optical encoder 59 and a rolling-contact bearing 55. The motor 60 is comprised of a rotor 54 fixed to the table 52, and a stator 53 mounted on a housing 61. With the rotary table system stated earlier, the table 52 is encased in the housing 61 for free rotation through the rolling-contact bearing 55 that is composed of an inner ring 56, an outer ring 57 and rolling elements of cylindrical rollers 58. The rolling-contact bearing 55 is constructed with a crossed-roller bearing in which the rollers 58 are arranged circumferentially with their axes intersecting alternately one another in such a manner that each roller can carry the table 52 against any load in every direction, either radial or axial.

Angular position control means in circular direction or θ-direction for a table supporting a work thereon is disclosed in Japanese Patent Laid-Open No. 238232/2000, where there is provided a linear motion guide unit of recirculating-ball nut and screw set comprising a screw shaft driven by a motor, and a ball nut fitting around the screw shaft for linear movement along the axial direction of the screw shaft as the screw shaft turns on its own axis. The ball nut has thereon a lug that makes engagement with a cam follower of forked rollers on a bracket arm, which extend out of the work table in a way the forked rollers coming in pinch engagement with the opposite sides of the lug. The linear motion guide unit is arranged flanking the work table while the bracket arm integral with the cam follower of forked rollers supports the work table for free rotation. With the position control means in θ-direction stated earlier, when the linear motion guide unit is energized, the lug communicates the linear motion along the axis of the screw shaft to the cam follower, which in turn moves the work table in θ-direction through the bracket arm to an angular position complying with the linear motion of the lug.

Disclosed in Japanese Utility Model Laid-Open No. 133540/1992 is a moving table system in which a ball thrust bearing is interposed between a base and a movable stage lying on the base, while actuators are arranged to move the stage relatively to the base in the horizontal towards any desired position. The movable stage lying on the base through the thrust bearing is connected at any side thereof to the actuators. With the moving table system cited earlier, moreover, linear guide members are mounted to the upper surface of the base and any side surface of the movable stage, one to each surface, in a relation that they extend in perpendicular to one another, while slide members articulated with each other through a hinged pin fit in the linear guide members for free sliding motion, one to each guide member. The conjugated slide members, upon movement of the stage, move along their associated guide members, with crooking on the hinged pin to follow easily the movement of the stage, thereby keeping the stage against a warp that might otherwise occur due to any eccentric load.

With the rotary table system as shown in FIG. 8, nevertheless, the rotor 54 of the motor 60 is arranged overall around the periphery of the table 52 while the stator core 53 is installed circumferentially in an annular groove in the housing 61 in opposition to the rotor 54. This type of the prior rotary table system results in becoming tall in height and a corresponding increase in dimensions, and also would get complicated in construction itself.

In the position control means in θ-direction stated in the former citation, the forked rollers of the cam follower, when having moved over any amount of angle, will interpose aslant the lug between them so that the engagement of the lug with the forked rollers becomes too unstable to make certain to provide highly accuracy angular position control. Moreover, since the cited position control means in θ-direction is urged with a compression spring, the pinching force exerted on the lug is apt to become too great as the work table turns far away from the neutral position. Counting on smooth position control will thus be questionable.

The movable table system disclosed in the latter citation is sophisticated in construction because distinct actuators are independently driven to move the stage towards any desired position. Moreover, the complicated mechanism is needed to keep the stage against any warp.

The prior table systems of the sort constructed as stated earlier have been made tall in overall height, complicated in construction itself and highly expensive in manufacturing cost. Production systems linked with semiconductors, for example semiconductor manufacturing equipment, image processing and inspection means, and so on can vary greatly in years and correspondingly makes a growing demand for high-accurate position controls that are compact or slim in construction as well as inexpensive in production cost.

Thus, it remains a major challenge to provide a table system with angular position control means, which enables to provide accurate position control in circular direction or in θ-direction with high response ability, even with smaller in size, fewer in part numbers and weighing less than the same sort of prior table system ever developed.

SUMMARY OF THE INVENTION

It is the primary object of the present invention to overcome the major problem as described just above and to provide a table system with angular position control means, which serves well for semiconductor manufacturing equipment, high-precision measuring means needed in image processing, inspection equipment, assembly machines, and so on. Still more particular object of the present invention is to provide a table system with angular position control means, which is constructed to provide accurate position control of tiny angle in circular direction and high response ability to the angular position control for an object such as a work supported on a table, even being made thin and small in height and compact or slim in construction.

The present invention is concerned with a table system with angular position control means, comprising a flat bed, a table supported on the bed for rotation through a first bearing means, an arm plate extending radially out of an outside periphery of the table, and a position control means arranged in a position flanking a side of the bed to move the table over a tiny angle in a circular direction through the arm plate, wherein the position control means is comprised of a motor mounted to a motor bracket that is secured to the side of the bed, a screw shaft lying lengthwise along the side of the bed and connected with a rotary shaft of the motor, a nut mating with the screw shaft to move along the screw shaft as the screw shaft rotates on its own axis, a first linear motion guide unit composed of a first track rail arranged in a way extending lengthwise of the side of the bed and a first slider moveable along the track rail, a carriage fastened to both the first slider and the nut, and a means for joining the carriage with the arm plate in a way allowing the arm plate to move in a circular direction as the carriage moves in a linear direction.

In one aspect of the present invention, a table system with angular position control means is provided in which the first bearing means is constituted with a crossed-roller bearing that is composed of an inner ring fastened around a hub of the table, an outer ring fit in an opening in the bed, and rollers interposed circumferentially between the inner ring and the outer ring, with their rolling axes being crossed alternately one another. The bearing means constructed as stated just above makes certain the high-precise, smooth movement of the table over a tiny angle in any circular direction relatively to the bed, thus providing high-accurate position control in the circular direction.

In another aspect of the present invention, a table system with angular position control means is provided in which the joining means is composed of a rotating shaft forming a turret means that is supported on the carriage for rotation through a second bearing means, and a second linear motion guide unit that is allowed to move the arm plate together with the table in a circular direction so as to continue keeping always the direction that looks towards a center of the table as the table turns.

In another aspect of the present invention, a table system with angular position control means is provided in which the second linear motion guide unit is composed of a second track rail secured on the turret means in such a way extending in a direction that looks towards the center of the table, and a second slider secured underneath the arm plate for linear movement along the second track rail in the direction that looks towards the center of the table.

In another aspect of the present invention, a table system with angular position control means is provided in which a nut and screw set made up of the screw shaft and the nut causes a linear motion that is in line with a tangent of the table, and the linear motion is translated into a circular motion to turn the table in any circular direction by virtue of a combination of the first linear motion guide unit interposed between the bed and the carriage to control the linear motion in the tangential direction, the second bearing means interposed between the carriage and the turret means, and the second linear motion guide unit to control a linear motion in the direction that looks towards the center of the table.

In a further another aspect of the present invention, a table system with angular position control means is provided in which the first and second linear motion guide units are each constituted with a linear motion rolling guide unit, the nut and screw set made up of the screw shaft and the nut is constituted with a recirculating-ball nut and screw shaft set, and the second bearing means supporting the rotating shaft forming the turret means is constituted with more than one angular-contact bearing. With the position control means constructed as stated earlier, all the three sorts of motions: rotation supported on the second bearing means, linear motion controlled by the first linear motion guide unit to keep the direction lying on the tangent of the table, and another linear motion controlled by the second linear motion guide unit to keep the direction looking to the center of the table are smoothly linked with one another without causing any rattling noise, making sure of high-accurate translational motion.

In another aspect of the present invention, a table system with angular position control means is provided in which another end of the screw shaft is supported for rotation through a third bearing means on an end bracket that is secured on the side of the bed in opposition to the motor bracket.

In another aspect of the present invention, a table system with angular position control means is provided in which the bed is formed in a quadrangular shape while the table is formed in a circular shape. This means the bed is formed in a configuration that has no portion of little avail, but makes attachment of the position control means onto the bed. The table is made in a shape that is preferable to hold a work thereon with stability.

In a further aspect of the present invention, a table system with angular position control means is provided in which the position control means is enclosed with a cover, except for the motor. The position control means, as made thin in height and arranged in a position flanking the table system, is enclosed with the covering for protection and dust proof.

In another aspect of the present invention, a table system with angular position control means is provided in which an origin mark is provided at another end of the screw shaft and a sensor is provided in opposition to the origin mark to sense the origin mark. Moreover, there is disclosed a table system with angular position control means, in which nearby lengthwise opposite ends of the first track rail, there are provided limit sensors on the side of the bed, one to each end of the track rail. A table system with angular position control means is also disclosed in which the table is made at the center thereof with an aperture for viewing, which is arranged in line an opening in the bed.

According to the table system with angular position control means constructed as stated above, the nut and screw set, when actuated by the motor, causes the motion in linear direction tangential to the table. The linear motion is translated, through the cooperative operation of the first linear motion guide unit, the second bearing means and the second linear motion guide unit, into the circular motion to turn the table in any circular direction.

The table system with angular position control means of the present invention provides a small table system that can serve well to provide accurate position control of a tiny angle in circular direction. The present table system, especially, deals with a major problem that the prior rotary table system to move the table over a tiny angle in any circular direction or θ-direction becomes inevitably large in height as shown in FIG. 8, succeeding in rendering the same sort of table slim in height, refined in precision, compact in construction and inexpensive in manufacturing costs. The table system of the present invention is also useful for the provision of an X-Y, θ-table system slim in height and refined in accuracy, when mounted on an X-Y table that is movable in both of X-direction and Y-direction perpendicular to the X-direction.

With the table system with angular position control means constructed as stated earlier, there are incorporated the first linear motion guide unit having the first slider movable in linear direction on the one side of the bed, and the second linear motion guide unit having the second slider movable in linear direction looking towards the circular center of the table, while the table is allowed to turn through the nut and screw shaft set when the screw shaft is rotated on its own axis. This construction results in the table system simple and compact in structure, and provides the position control means enabling the position control of a tiny amount of angle, which is high in precision and response, with even very inexpensive in production costs.

Thus, the table system with angular position control means of the present invention, upon being mounted on an X-Y table, can provide the slim, high-accurate X-Y, θ-table system that is preferably adapted for the machinery and apparatus as diverse as various sorts of robots, semiconductor manufacturing machines, precision machines, machine tools, precision measuring means for image processing, inspection means, assembly machines, and so on.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

A preferred embodiment of a table system with angular position control means according to the present invention will be explained hereinafter in detail with reference to the accompanying drawings. The table system with angular position control means of the present invention serves well for machinery in fields as diverse as various industrial robots, semiconductor manufacturing equipment, high-precision machines, machine tools, high-precision measuring means needed in image processing, inspection equipment, assembly machines, and so on.

Figure 1:
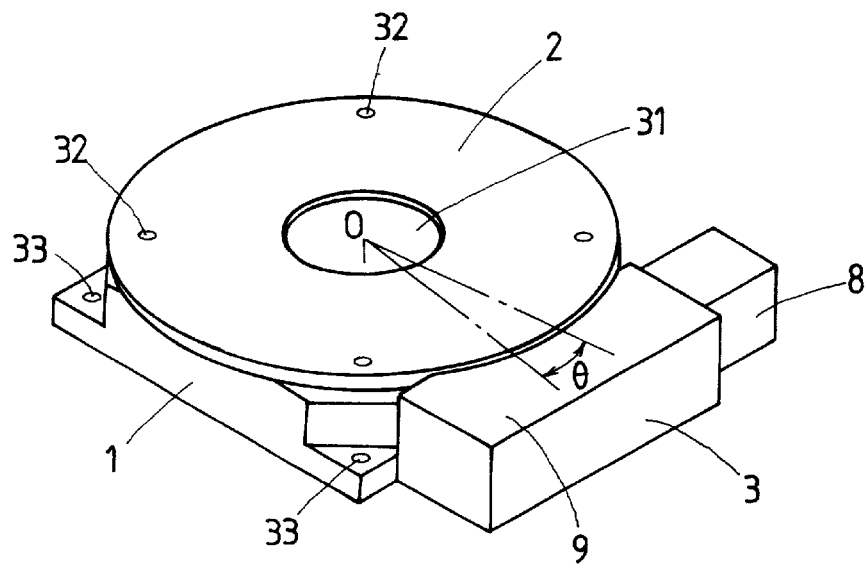
FIG. 1 is a perspective view showing a preferred embodiment of a table system with angular position control means in accordance with the present invention.
Figure 2:
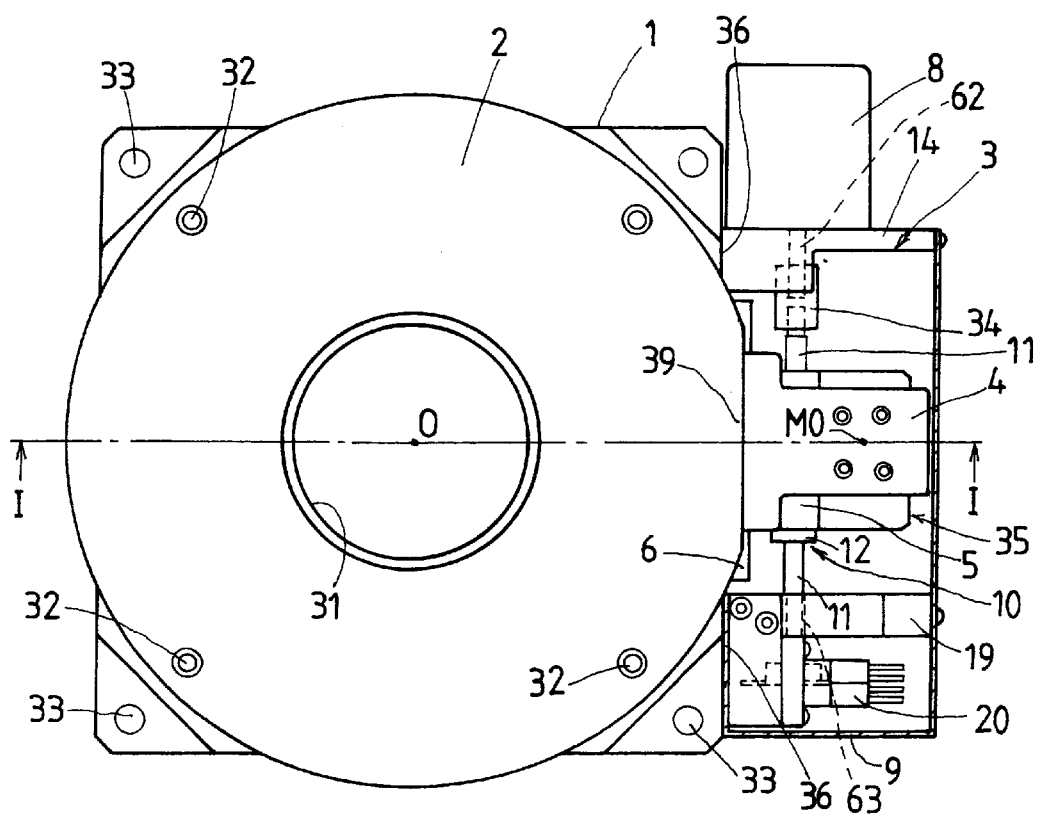
FIG. 2 is a top plan view of the table system illustrated in FIG. 1 with a top cover being removed to show inside details of the angular position control means.
Figure 3:
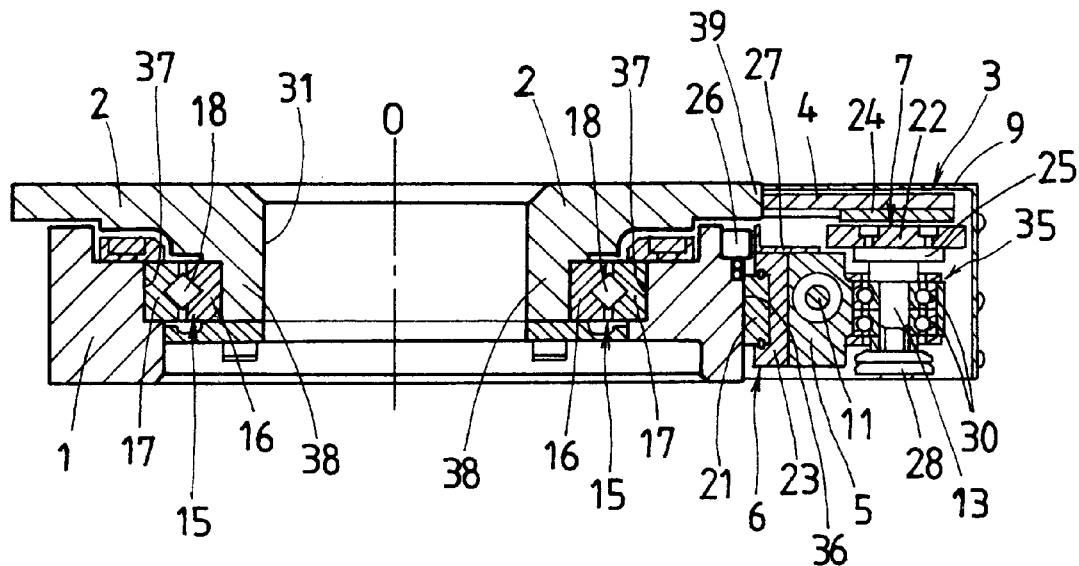
FIG. 3 is sectional view of the table system with angular position control means, the view being taken on the plane of the lines I—I of FIG. 2.

The table system with angular position control means of the present invention, as shown in FIGS. 1 to 3, is mainly comprised of a machine bed 1 of thick quadrangular plate, a circular table 2 supported at the center of the bed 1 for rotation through a crossed-roller bearing 15 serving as a first bearing means, an arm plate 4 extending radially out a circumferential periphery 39 of the table 2, and a position control means 3 connected to the table 2 through the arm plate 4 to turn the table 2 over a tiny angle in any circular direction. The position control means 3, as shown in FIGS. 1 to 5, is really arranged on a side 36 of the bed 1, which parallels a tangential direction of the table 2. Moreover, the position control means 3 has various devices such as an electric power source, driver, and controls, which are not shown in the drawings.

As seen from FIG. 1, the table 2 is made at the center thereof with an aperture 31 for viewing, which is arranged in line with an opening in the bed 1. The position control means 3 is arranged in a position flanking any one side 36 of the bed 1, thus opposing a circumferential area of the table 2, which parallels the side 36 of the bed 1. The table 2 is formed in a circular configuration in plan view and made with bolt holes 32 used to mount any object such as a work on a top surface of the table 2, while the bed 1 is made of a thick quadrangular plate and has at four corners thereof bolt holes 33 used to fasten the table system to a linear position controls such as X-Y table and so on.

The bed 1 of thick quadrangular plate, as illustrated in FIG. 3, is made at the center thereof with a round opening 37 in which the table 2 is accommodated for rotation relatively to the bed 1. The first bearing 15 of the crossed-roller bearing is interposed between the bed 1 and the table 2 in such a manner that an outer ring 17 of the first bearing 15 fits in the round opening 37 of the bed 1 while the an outer ring 16 of the first bearing 15 fits over an outside periphery of an annular hub 38 of the table 2. It will be thus understood that the table 2 is supported for rotation on the bed 1 through the crossed-roller bearing 15. Between the inner ring 16 held on the table 2 and the outer ring 17 close fit in the bed 1 there are arranged circumferentially many rollers 18, with their axes intersecting alternately one another to form the crossed-roller bearing 15 enabling carry the table 2 on the bed 1 against any load in every direction, either radial or axial.

The position control means 3 is comprised of a motor bracket 14 fastened to the side 36 of the bed 1, a motor 8 supported on the bracket 14, a screw shaft 11 connected to a rotating shaft 62 of the motor 8 and extending lengthwise of the side 36 of the bed 1, a nut 12 mating with the screw shaft 11 to move in linear direction along the screw shaft 11 as the screw shaft 11 rotates, a first linear motion guide unit 6 including a first track rail 21 lying in parallel with a lengthwise direction of the side 36 of the bed 1 and a first slider 23 movable along the first track rail 21, a carriage 5 held on the nut 12 that is in turn connected to the first slider 23, and a joint means 35 connect the carriage 5 with the arm plate 4 in a way allowing the arm plate 4 to turn on the joint means 35 as the carriage 5 moves in any linear direction together with the joint means 35. The position control means 3 is enclosed with a cover 9, except for the motor 8 fastened to the motor bracket 14.

With the position control means 3 constructed as stated earlier, the rotating shaft 62 of the motor 8 is connected to any one end of forward and aft ends of the screw shaft 11 through a coupling 34. The screw shaft 11 is also supported for rotation at the opposite end thereof through a third bearing 63 to an end bracket 19 that is secured to the side 36 of the bed 1 in opposition to the motor bracket 14. The first track rail 21 for the first linear motion guide unit 6 extends lengthwise between the motor bracket 14 and the end bracket 19 along the side 36 of the bed 1. The carriage 5, as shown in FIG. 3, is made therein with bore to allow the screw shaft 11 to extend fore and aft through the carriage 5 and also attached to the nut 12 fastened to the slider 23. A turret means 25 lies below the arm plate 4 and is constituted with a turning shaft 13 that is supported for rotation to the carriage 5 through second bearing means 30 secured to the turning shaft 13 by means of a fixing nut 28.

Figure 4:
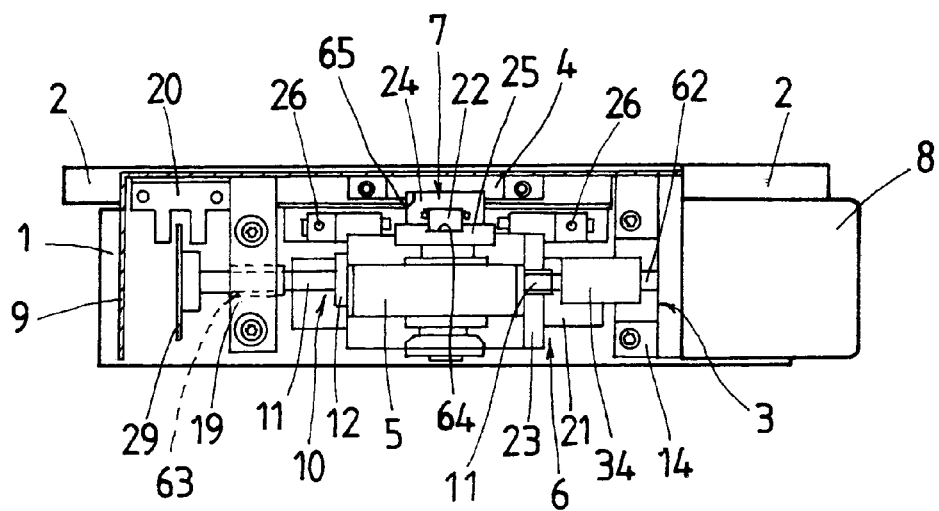
FIG. 4 is a side elevation viewed from the right side of FIG. 2, but a side cover being removed to illustrate inside details of the angular position control means.
Figure 5:
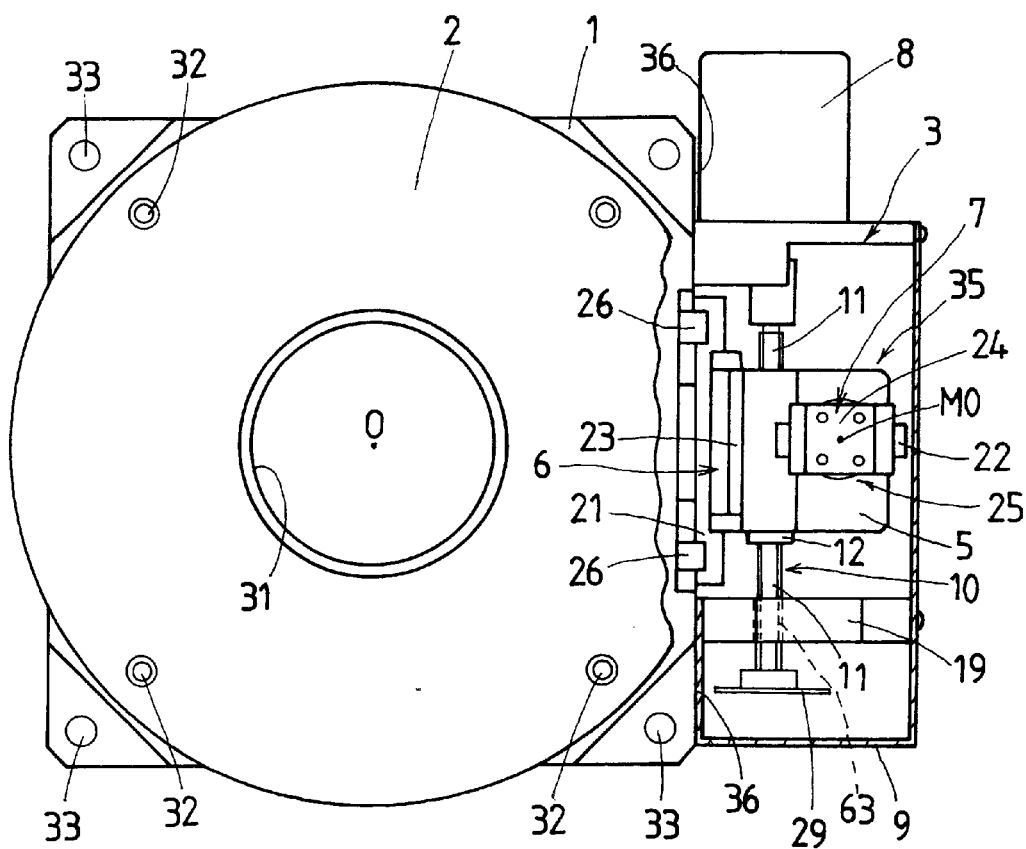
FIG. 5 is a top plan view similar to FIG. 2, but the top cover being removed together with an arm plate to connect the angular position control means to a table, as seen looking into the interior of the angular position control means.

The joint means 35 is made up of the turret means 25 constituted with the turning shaft 13 supported to the carriage 5 for rotation through the second bearing means 30, and a second linear motion guide unit 7 to link the arm plate 4 with the turret means 25 to allow the arm plate 4 to move towards the circular center O of the table 2 as the table 2 turns in any circular direction. That is to say, the second linear motion unit 7 is to associate the arm plate 4 with the turret means 25 for relative movement to one another. The second linear motion guide unit 7, as illustrated in FIGS. 4 and 5, is composed of a second track rail 22 lying on an upper surface to extend towards the circular center O of the table 2, and a second slider 24 moveable radially along the second track rail 22 in a direction towards the circular center O of the table 2 and secured underneath the arm plate 4. As shown in the concrete in FIG. 4, the second linear motion guide unit 7 is make up of the second track rail 22 that fits closely in a slot 64 formed on the upper surface of the turret means 25, and the second slider 24 that fits over astride the second track rail 22 for sliding movement along the second track rail 22 while fits closely in a slot 65 formed underneath the table 2 in a radial direction towards the circular center O of the table 2.

The screw shaft 11 is supported for rotation at the end thereof opposite to the motor 8 through the third bearing 63 to the end bracket 19 that is fastened to the side 36 of the bed 1 in opposition to the motor bracket 14. On the opposite end of the screw shaft 11 there is provided a disc-shaped origin mark 29. On the end bracket 19 there is provided an origin sensor 20 in opposition to the origin mark 29 to sense the origin mark 29, thereby determining an origin position. Nearby lengthwise opposite ends of the first track rail 21 there are provided limit sensors 26 on the side 36 of the bed 1, one to each end of the track rail 21, to sense their associated limit plates 27 of the carriage 5, thus keeping the carriage 5 against runaway beyond a preselected travel range.

Figure 7:
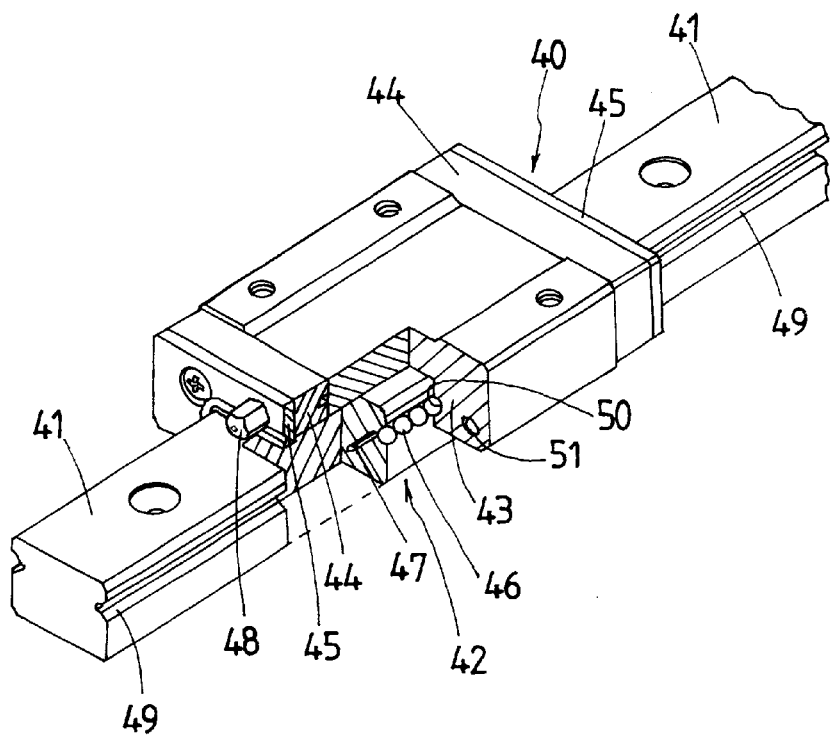
FIG. 7 is a perspective view, partially broken away, showing a linear motion guide unit to be adapted to the table system with angular position control means of the present invention.
Figure 8:
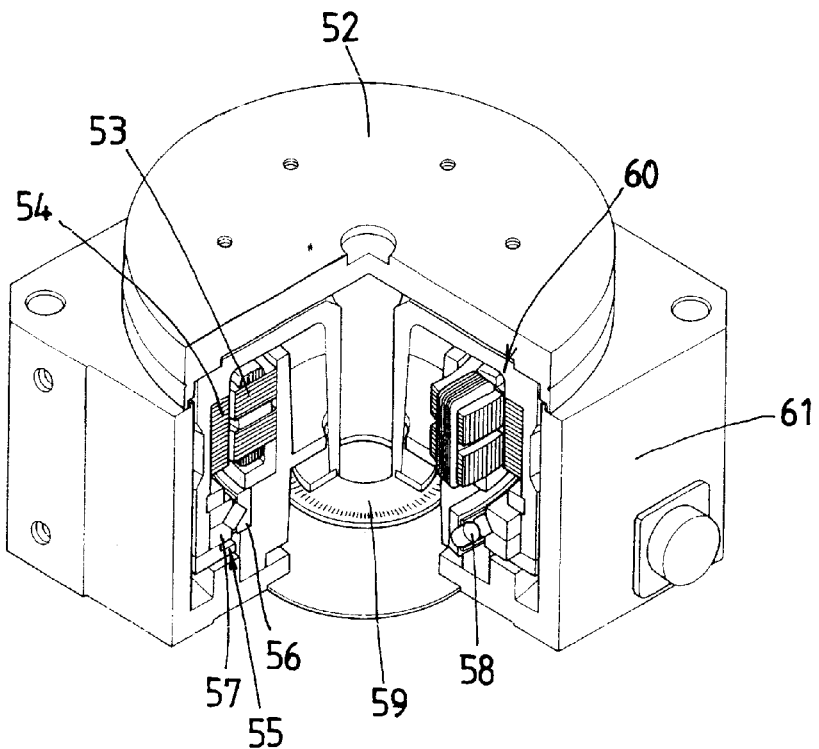
FIG. 8 is a perspective view, partially broken away, showing a prior rotary table system.

With the table system with angular position control means constructed as stated earlier, many rolling elements such as balls, although not shown, are placed in everyone of the first linear motion guide unit 6, the second linear motion guide unit 7, the a recirculating ball-nut and screw shaft set made up of the screw shaft 11 and the nut 12, and the bearing means 30 supporting for rotation the turning shaft 13 that provides the turret means 25. In the first and second linear motion guide units 6, 7 adopted in the table system with angular position control means of the present invention, more than one ball is interposed in a way running through between the confronting raceway grooves of the track rail 21, 22 and the slider 23, 24 to provide the same linear motion guide unit as shown in FIG. 7, making certain the smooth linear movement of the slider 23, 24 without rattling noise. Moreover, the screw shaft 11 provides a ball screw while the nut 12 is a ball nut. Thus, the screw shaft 11 and the nut 12 make up a ball-recirculating nut and screw set 10 in which more than one ball is interposed between the screw shaft 11 and the nut 12. Thus, as the screw shaft 11 rotates, the screw shaft 11 forces the balls to roll, thereby moving the ball nut 12 smoothly without rattling condition in linear direction along the screw shaft 11. The bearing means 30 is constituted with more than one angular-contact bearing to support the turret means 25 on the carriage 5 in a way allowing the turret means 25 to turn smoothly without rattling condition.

The table system with angular position control means of the present invention constructed as stated earlier will operate in a way explained in the following.

Figure 6:
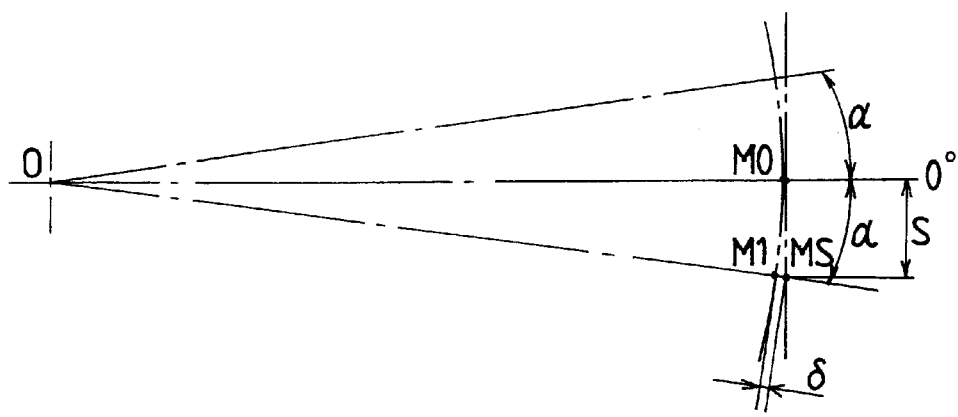
FIG. 6 is a graphic view explaining an amount of adjustment caused by a movement of the table in any circular direction when the angular position control means drives the table in the table system with the angular position control means of the present invention.

With the present table system with angular position control means, as energization of the motor 8 gets the screw shaft 11 rotated on its own axis to move the table 2 over a desired angle α in circular direction as depicted in FIG. 6, the ball nut 12 mating with the screw shaft 11 is forced along the screw shaft 11. Thus, the carriage 5 fastened to the ball nut 12 is allowed to move in linear direction by virtue of the first linear motion guide unit 6 lying lengthwise on the side 36 of the bed 1. Consequently the arm plate 4 is allowed to move together with the carriage 5, getting the table 2 to turn over a tiny angle. It is to be noted that the turret means 25 cooperates with the second linear motion guide unit 7 to translate well the linear movement of the carriage 5 into the motion of the table 2 in the circular direction. The translational operation between the turret means 25 and the second linear motion guide unit 7 will be hereinafter explained with reference to FIG. 6 wherein α represents an amount of movement in circular direction attributed to the second bearing means and δ is an amount of linear movement attributed to the second slider of the second linear motion guide unit. Now assuming that the arm plate 4 joined with the table 2 moves over a desired angle α in an circular direction from a neutral point MO, the arm plate 4 would move in a straight line towards other point MS that lies a distance S away. However, the neutral point MO will really move in circular direction towards a point M1 that is off radially inwardly the point M1 by a distance δ. To cope with this discrepancy of distance δ between the points M1 and Ms, the second linear motion guide unit 7 moves in a sliding manner underneath the arm plate 4 to get the turret means 25 turned over a tiny angle, thus bringing the point MS on the straight line into coincidence with the point M1 at the tiny angle α on the circular line that parallels the curvature of the table 2. The track rail 22 of the second linear motion guide unit 7 is allowed to turn so as to continue keeping always the direction that looks towards the center O of the table 2. It will be noted that the second linear motion guide unit 7 and the turret means 25 work at the same time.

What is claimed is:

1. A table system with angular position control means, comprising a flat bed, a table supported on the bed for rotation through a first bearing means, an arm plate extending radially out of an outside periphery of the table, and a position control means arranged in a position flanking a side of the bed to move the table over a tiny angle with respect to the bed in a circular direction through the arm plate, wherein the position control means is comprised of a motor mounted to a motor bracket that is secured to the side of the bed, a screw shaft lying lengthwise along the side of the bed and connected with a rotary shaft of the motor, a nut mating with the screw shaft to move along the screw shaft as the screw shaft rotates on its own axis, a first liner motion guide unit composed of a first track rail arranged in a way extending lengthwise of the side of the bed and a first slider moveable along the track rail, a carriage fastened to both the first slider and the nut, and a joining means for joining the carriage with the arm plate to translate a linear movement of the carriage caused by the motor into a circular movement over the tiny angle of the arm plate, and wherein the joining means is composed of a second bearing means on the carriage, a turret means that is supported on the carriage, a turret means that is supported on the carriage for rotation through the second bearing means, and a second linear motion guide unit connecting the turret means to the arm plate whereby the linear movement of the carriage caused by the motor is translated into the circular movement of the arm plate.

2. A table system with angular position control means, constructed as defined in claim 1, wherein the first bearing means is constituted with a crossed-roller bearing that is composed of an inner ring fastened around a hub of the table, an outer ring fit in an opening in the bed, and rollers interposed circumferentially between the inner ring and the outer ring, with their rolling axes being crossed alternately one another.

3. A table system with angular position control means, constructed as defined in claim 1, wherein the second linear motion guide unit is composed of a second track rail secured on the turret means, and a second slider secured underneath the arm plate for linear movement along the second track rail in the direction that looks towards the center of the table.

4. A table system with angular position control means, constructed as defined in claim 1, wherein a nut and screw set made up of the screw shaft and the nut causes a linear motion that is in line with a tangent of the table, and the linear motion is translated into a circular motion to turn the table in any circular direction by virtue of a combination of the first linear motion guide unit interposed between the bed and the carriage to control the linear motion in the tangential direction, the second bearing means interposed between the carriage and the turret means, and the second linear motion guide unit interposed between the turret means and the arm plate.

5. A table system with angular position control means, constructed as defined in claim 1, wherein the first and second linear motion guide units are each constituted with a linear motion rolling guide unit, the nut and screw set made up of the screw shaft and the nut is constituted with a recirculating-ball nut and screw shaft set, and the second bearing means supporting the turret means is constituted with more than one angular-contact bearing.

6. A table system with angular position control means, constructed as defined in claim 1, wherein another end of the screw shaft is supported for rotation through a third bearing means on an end bracket that is secured on the side of the bed in opposition to the motor bracket.

7. A table system with angular position control means, constructed as defined in claim 1, wherein the bed is formed in a quadrangular shape while the table is formed in a circular shape.

8. A table system with angular position control means, constructed as defined in claim 1, wherein the position control means is enclosed with a cover, except for the motor.

9. A table system with angular position control means, constructed as defined in claim 1, wherein an origin mark is provided at the another end of the screw shaft and a sensor is provided in opposition to the origin mark to sense the origin mark.

10. A table system with angular position control means, constructed as defined in claim 1, wherein nearby lengthwise opposite ends of the first track rail, there are provided limit sensors on the side of the bed, one to each end of the track rail.

11. A table system with angular position control means, constructed as defined in claim 1, wherein the table is made at the center thereof with an aperture for viewing, which is arranged in corresponding to an opening of the bed.

* * * * *